G. W. KNIGHT.
Potato Digger.
No. 99,575. Patented Feb. 8, 1870.
Fig. 1.
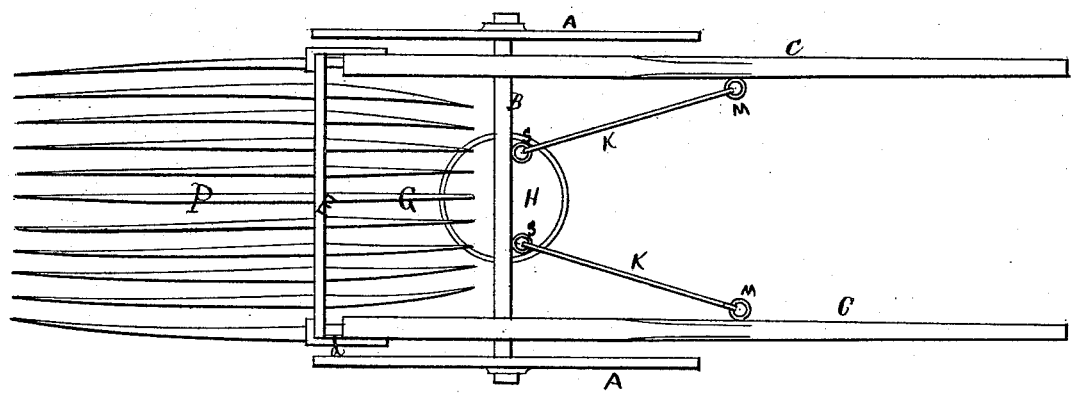
Fig. 2.
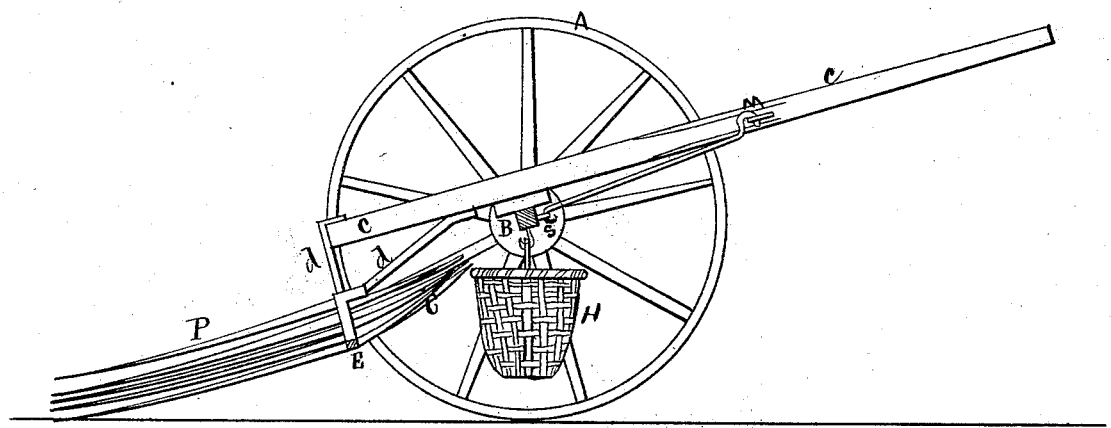
Fig. 3.  Fig. 4.  Fig. 5.
Witnesses:
Edw Brower
Jos. Raby
Geo. W. Knight

United States Patent Office.

GEORGE W. KNIGHT, OF CAMDEN, NEW JERSEY.

Letters Patent No. 99,575, dated February 8, 1870.

IMPROVED POTATO-DIGGER.

The Schedule referred to in these Letters Patent and making part of the same

I, GEORGE W. KNIGHT, of Camden, in the county of Camden, and State of New Jersey, have invented a new and useful "Potato-Digger," of which the following is a specification, reference being had to the accompanying drawings, making part of this specification, of which—

Figure 1 is a plan of the machine.
Figure 2 is an elevation.
Figure 3 shows the curved line to which the points of the fork are made.
Figure 4 shows the curve of the supporting rim of the fork, through which the tines pass.
Figure 5 shows the curve to which the conductor is made at the upper end of the fork.

The nature of my invention consists in a fork attached to shafts, and carried upon wheels, the said fork being so shaped and constructed that the tilting motion of the shafts causes the potatoes to be deposited in a basket upon the machine.

Referring to the drawings—
A are the wheels.
B, the axle, carrying the shafts C.

To the lower end of the shafts, is secured a frame, d d, carrying the cross-bar E, through which the tines of the fork pass and are secured. The top edge of the cross-bar is made as near flush with the fork as possible, so as the potatoes roll over it easily.

The fork P is made of steel or iron, shaped like the common dung-fork, about eighteen inches wide, twenty-one inches long in the tines, and one and three-eighths inch of space between them.

The cross-bar E has a socket at each end, attaching it to the supporters d d, at the ends of the handles.

The tines, above the bar E, converge so as to form a trough or conductor, G, about ten inches long. The potatoes, which roll over the cross-bar E, pass down the conductor into the basket H, hung upon the axle. The cross-section of the fork, at the point, centre, and ends of the conductor, is shown by figs. 3, 4, and 5.

To the axle are hinged the two legs K K. The other ends of these legs are supported in hooks M, upon the shafts, when not in use.

The axle B is about thirty inches long, the wheels three feet in diameter, and the length of the machine, from the extremity of the handles to the points of the tines, seventy-two inches.

The operation of the machine is in this manner:

The operator stands between the handles or shafts C, and pushes the machine as he would a common push-cart or wheelbarrow. He elevates the handles, and forces the fork into a hill, beneath the potatoes; then depressing the handles, the soil is loosened, and the dirt shaken off from the potatoes by a lateral motion of the machine. If the legs K are unhooked from the shafts, and permitted to drag over the soil, they would then assist the operator in thrusting the fork into the hill.

Simply depressing the handles would then thrust the machine forward, the effect being still more noticeable, the higher the hinge s is raised above the axle.

As soon as the dirt is shaken from the potatoes, in the manner previously described, the handles are further depressed, and the potatoes roll over the cross-bar E, down the conductor G, into the basket H.

By this machine, a man can dig and gather more potatoes than by any other machine.

A horse may be attached to the front of the handles, at d, as an assistance to the man in propelling the machine, if found necessary.

I make no claim to attaching a potato-fork to shafts, and supporting upon wheels; but I do claim—

1. The fork P, secured to the handles C, upon wheels, the said fork being shaped, as shown, so that the potatoes pass over it, and down the conductor G, into the basket H, in the manner substantially as herein shown and described.

2. The legs K, arranged and operating in combination with the shafts C, fork P, and axle B, in the manner and for the purpose herein described.

GEO. W. KNIGHT.

Witnesses:
WILLIAM I. BURNHAM,
HORACE B. KELLY.